(12) United States Patent
Arora et al.

(10) Patent No.: US 10,397,753 B2
(45) Date of Patent: Aug. 27, 2019

(54) SYSTEMS AND METHODS FOR FUSING INERTIAL AND BLUETOOTH LOW ENERGY SENSOR DATA FOR LOCALIZATION

(71) Applicant: Tata Consultancy Services Limited, Mumbai (IN)

(72) Inventors: Shalini Arora, Noida (IN); Avik Ghose, Kolkata (IN); Shivani Johari, Noida (IN); Vivek Chandel, Gurgaon (IN); Nasimuddin Ahmed, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 216 days.

(21) Appl. No.: 15/336,191

(22) Filed: Oct. 27, 2016

(65) Prior Publication Data
US 2017/0127242 A1 May 4, 2017

(30) Foreign Application Priority Data
Nov. 4, 2015 (IN) .......................... 4198/MUM/2015

(51) Int. Cl.
*G01C 19/00* (2013.01)
*G01S 11/06* (2006.01)
(Continued)

(52) U.S. Cl.
CPC .............. *H04W 4/04* (2013.01); *G01C 19/00* (2013.01); *G01C 21/165* (2013.01); *G01C 21/206* (2013.01); *G01S 11/06* (2013.01)

(58) Field of Classification Search
CPC ..... H04W 4/04; G01C 21/206; G01C 21/165; G01C 19/00; G01S 11/06
See application file for complete search history.

(56) References Cited

U.S. PATENT DOCUMENTS 6,236,768 B1 * 5/2001 Rhodes ................. G06F 16/907
382/306
8,712,690 B1 * 4/2014 White ................... G01C 21/206
701/526
(Continued)

FOREIGN PATENT DOCUMENTS

WO    WO 2015/079206 A1    6/2015

OTHER PUBLICATIONS

Baniukevic et al., "Hybrid Indoor Positioning With Wi-Fi and Bluetooth Architecture and Performance", 2013 IEEE 14th International Conference on Mobile Data Management, IEEE Computer Society, vol. 1, pp. 207-216, 2013.
(Continued)

*Primary Examiner* — Mohammad K Islam
(74) *Attorney, Agent, or Firm* — Finnegan, Henderson, Farabow, Garrett & Dunner LLP (57) ABSTRACT

Sensor data fusing systems and methods are provided. The fusing system reads and parses a floor plan to obtain a location of a user, identifies a grid in the floor plan using the location, determines a distance between the user and beacons placed at every corner of identified grid, and further trilaterating the location using beacon identifiers. The system further assigns a weight to the trilaterated location based on the distance between the user and the beacons in the grid to obtain a first set of weights, and computes one or more weights using number of particles generated with respect to an inertial measurement obtained from an inertial sensor to obtain a second set of weights. The fusing system further fuses the first set of weights and the second set of weights to obtain a first and a second co-ordinate that indicates specific position of the user in the location.

18 Claims, 5 Drawing Sheets

(51) Int. Cl.
    *H04W 4/04* (2009.01)
    *G01C 21/16* (2006.01)
    *G01C 21/20* (2006.01)

(56) References Cited

U.S. PATENT DOCUMENTS

| | | | | |
|---|---|---|---|---|
| 9,453,902 | B2* | 9/2016 | Pan | G01S 5/0252 |
| 10,280,054 | B2* | 5/2019 | High | E01H 5/12 |
| 2012/0083705 | A1* | 4/2012 | Yuen | A61B 5/0002 |
| | | | | 600/508 |
| 2013/0095849 | A1* | 4/2013 | Pakzad | H04W 64/00 |
| | | | | 455/456.1 |
| 2013/0122935 | A1* | 5/2013 | Das | G01S 5/0252 |
| | | | | 455/456.3 |
| 2013/0267178 | A1* | 10/2013 | Pakzad | H04W 4/029 |
| | | | | 455/67.7 |
| 2013/0332065 | A1* | 12/2013 | Hakim | H04W 64/00 |
| | | | | 701/411 |
| 2014/0011518 | A1* | 1/2014 | Valaee | H04W 64/00 |
| | | | | 455/456.1 |
| 2014/0139375 | A1* | 5/2014 | Faragher | G01S 5/0294 |
| | | | | 342/451 |
| 2014/0198227 | A1* | 7/2014 | Mohammad Mirzaei | |
| | | | | G01C 21/12 |
| | | | | 348/208.2 |
| 2014/0274151 | A1* | 9/2014 | Pattabiraman | H04W 4/029 |
| | | | | 455/456.3 |
| 2015/0081201 | A1* | 3/2015 | Rubin | G08G 9/02 |
| | | | | 701/301 |
| 2015/0282111 | A1* | 10/2015 | Yang | H04W 64/00 |
| | | | | 455/456.1 |
| 2016/0189186 | A1* | 6/2016 | Fabrikant | G06Q 30/0205 |
| | | | | 705/7.34 |
| 2016/0259329 | A1* | 9/2016 | High | E01H 5/12 |
| 2016/0285416 | A1* | 9/2016 | Tiwari | H02S 50/15 |
| 2017/0142323 | A1* | 5/2017 | Saito | G03B 15/00 |
| 2017/0219359 | A1* | 8/2017 | Elhoushi | G01C 21/206 |
| 2017/0238136 | A1* | 8/2017 | Smith | H04W 4/029 |
| | | | | 455/456.3 |
| 2018/0067187 | A1* | 3/2018 | Oh | H04W 64/00 |
| 2018/0167783 | A1* | 6/2018 | Khoche | G06K 19/07773 |
| 2018/0249306 | A1* | 8/2018 | Pandharipande | H04Q 9/00 |

OTHER PUBLICATIONS

E.B. van der Laan, "Radio propagation aided indoor localization : Indoor localization by applying Proportionate Measurement Localization (PML) using Bluetooth Low Energy tags", Master of Science Geomatics for the Built environment—Delft University of Technology, pp. 1-111, 2014.

Pagano et al., "Indoor ranging and localisation algorithm based on received signal strength indicator using statistic parameters for wireless sensor networks", IET Wireless Sensor Systems, IET Journals the Institution of Engineering and Technology, Affiliations: Department of Naval, Electrical, Electronic and Telecommunications Engineering, University of Genoa, via Opera Pia 11A, Genoa 16145, Italy, vol. 5, Iss. 5, pp. 243-249, 2015.

* cited by examiner

| GROUND TRUTH | | INERTIAL | | BLE | | FUSED | |
|---|---|---|---|---|---|---|---|
| X | Y | X | Y | X | Y | X | Y |
| 186 | 66 | 175.14 | 71.98 | 186.17 | 93.6 | 185.4006966665 | 72.5944461801 |
| 186 | 66 | 179.03 | 70.68 | 200.78 | 68.38 | 196.6443137047 | 69.4631122461 |
| 186 | 84 | 173.98 | 90.4 | 188.8 | 80.3 | 186.8006133788 | 88.2898327287 |
| 186 | 84 | 179.02 | 88.65 | 176 | 93.16 | 179.7841512266 | 87.6957816135 |
| 168 | 90 | 164.89 | 83.04 | 167.59 | 101.56 | 169.3227643297 | 83.252054759 |
| 168 | 90 | 172.02 | 92.9 | 167.59 | 101.57 | 171.7147770149 | 92.20512497 |
| 168 | 36 | 173.84 | 22.54 | 164.9 | 14.09 | 170.4954653169 | 21.5549841135 |
| 168 | 24 | 165.09 | 23.43 | 162.72 | 16.3 | 166.0770021733 | 22.5340163233 |

SYSTEMS AND METHODS FOR FUSING INERTIAL AND BLUETOOTH LOW ENERGY SENSOR DATA FOR LOCALIZATION

PRIORITY CLAIM

This U.S. patent application claims priority under 35 U.S.C. § 119 to: India Application No. 4198/MUM/2015, filed on Nov. 4, 2015. The entire contents of the aforementioned application are incorporated herein by reference.

TECHNICAL FIELD

This disclosure relates generally to localization systems, and more particularly to systems and methods for fusing inertial and Bluetooth low energy sensor data for localization.

BACKGROUND

Indoor localization using both radio frequency (RF) and inertial sensors on a mobile device is a common approach. Localization and mapping are performed to compute the most probable location using sensors and control values (if any). Current solutions have considered both the techniques and methods of fusing them. One of the existing solution is inertial navigation using Pedestrian Dead Reckoning (PDR) and particle filter (PF), which is a standard approach. However, it is well-known and evident from experimental results that PDR is susceptible to stride-length inaccuracies and magnetic noise. Another approach is using Received Signal Strength Indication (RSSI) from Radio Frequency (RF) sources on a mobile phone. Since signal strength decays with distance, it is possible to elucidate distance from the same. However, such measurements are corrupted by multipath and fading. Hence, none of the methods are individually correct but can provide location information with some granularity and error distribution.

SUMMARY

Embodiments of the present disclosure present technological improvements as solutions to one or more of the above-mentioned technical problems recognized by the inventors in conventional systems. For example, in one aspect, a sensor data fusing system for localization is provided. The system comprising: a memory storing instructions; a processor communicatively coupled to the memory, wherein the processor is configured by the instructions to: read and parse a floor plan to obtain a location of a user, wherein the floor plan comprises a plurality of grids; identify a grid from the plurality of grids using the location of the user, wherein the grid comprises a plurality of beacons; determine a distance between the user and the plurality of beacons in the identified grid; trilaterate the location of the user using a plurality of beacon identifiers, each beacon identifier of the plurality of beacon identifiers is specific to a beacon from the plurality of beacons; assign a weight to the trilaterated location based on the distance between the user and the plurality of beacons in the grid to obtain a first set of weights; compute one or more weights using number of particles generated with respect to an inertial measurement obtained from an inertial sensor to obtain a second set of weights; and fuse the first set of weights and the second set of weights to obtain a first coordinate and a second co-ordinate of a specific position of the user in the location.

The weight is assigned as a higher weight when the distance between the user and each of the plurality of beacons in the identified grid is greater than a predefined distance from each beacon placed at each corner of the grid. The weight is assigned as a lower weight when the distance between the user and each of the plurality of beacons in identified grid is less than a predefined distance from each beacon placed at each corner of the grid. A row vector in the plurality of grids is identified based on a first initial co-ordinate of the location using a binary search technique. A column vector corresponding to the row vector in the plurality of grids is identified based on a second initial co-ordinate of the location using a linear binary search technique. The grid and each beacon identifier specific to each beacon from the plurality of beacons are identified based on an intersection of the row vector and the column vector to obtain the set of beacon identifiers.

In another aspect, a hardware processor implemented method is provided. The method comprising: reading and parsing a floor plan to obtain a location of a user, wherein the floor plan comprises a plurality of grids; identifying a grid from the plurality of grids using the location of the user, wherein the grid comprises a plurality of beacons; determining a distance between the user and the plurality of beacons in the identified grid; trilaterating the location of the user using a plurality of beacon identifiers, each beacon identifier specific to a beacon from the plurality of beacons; assigning a weight to the trilaterated location based on the distance between the user and the plurality of beacons in the identified grid to obtain a first set of weights; computing one or more weights using number of particles generated with respect to an inertial measurement obtained from an inertial sensor to obtain a second set of weights; and fusing the first set of weights and the second set of weights to obtain a first coordinate and a second co-ordinate of a specific position of the user in the location.

The step of assigning a weight to the trilaterated location comprises assigning a higher weight when the distance between the user and each of the plurality of beacons in the identified grid is greater than a predefined distance from each beacon placed at each corner of the grid. The step of assigning a weight to the trilaterated location comprises assigning a lower weight when the distance between the user and each of the plurality of beacons in the identified grid is less than a predefined distance from each beacon placed at each corner of the grid. The step of identifying the grid comprises identifying a row vector in the one or more grids based on a first initial co-ordinate of the location using a binary search technique, identifying a column vector corresponding to the row vector in the plurality of grids based on a second initial co-ordinate of the location using a linear binary search technique, and identifying the grid and each beacon identifier specific to each beacon from the plurality of beacons based on an intersection of the row vector and the column vector to obtain the set of beacon identifiers.

In yet another aspect, one or more non-transitory machine readable information storage mediums comprising one or more instructions is provided, which when executed by one or more hardware processors causes reading and parsing a floor plan to obtain a location of a user, wherein the floor plan comprises a plurality of grids; identifying a grid from the plurality of grids using the location of the user, wherein the grid comprises a plurality of beacons; determining a distance between the user and the plurality of beacons in the identified grid; trilaterating the location of the user using a plurality of beacon identifiers, each beacon identifier of the plurality of beacon identifiers is specific to a beacon from the plurality of beacons: assigning a weight to the trilaterated location based on the distance between the user and the plurality of beacons in the grid to obtain a first set of weights; computing one or more weights using number of particles generated with respect to an inertial measurement obtained from an inertial sensor to obtain a second set of weights; and fusing the first set of weights and the second set of weights to obtain a first coordinate and a second co-ordinate of a specific position of the user in the location.

The step of assigning a weight to the trilaterated location comprises assigning a higher weight when the distance between the user and each of the plurality of beacons in the identified grid is greater than a predefined distance from each beacon placed at each corner of the grid. The step of assigning a weight to the trilaterated location comprises assigning a lower weight when the distance between the user and each of the plurality of beacons in the identified grid is less than a predefined distance from each beacon placed at each corner of the grid. The step of identifying the grid comprises identifying a row vector in the one or more grids based on a first initial co-ordinate of the location using a binary search technique, identifying a column vector corresponding to the row vector in the plurality of grids based on a second initial co-ordinate of the location using a linear binary search technique, and identifying the grid and each beacon identifier specific to each beacon from the plurality of beacons based on an intersection of the row vector and the column vector to obtain the set of beacon identifiers.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through 60, where similar reference characters denote corresponding features consistently throughout the figures, there are shown preferred embodiments and these embodiments are described in the context of the following exemplary system and/or method.

Figure 1:
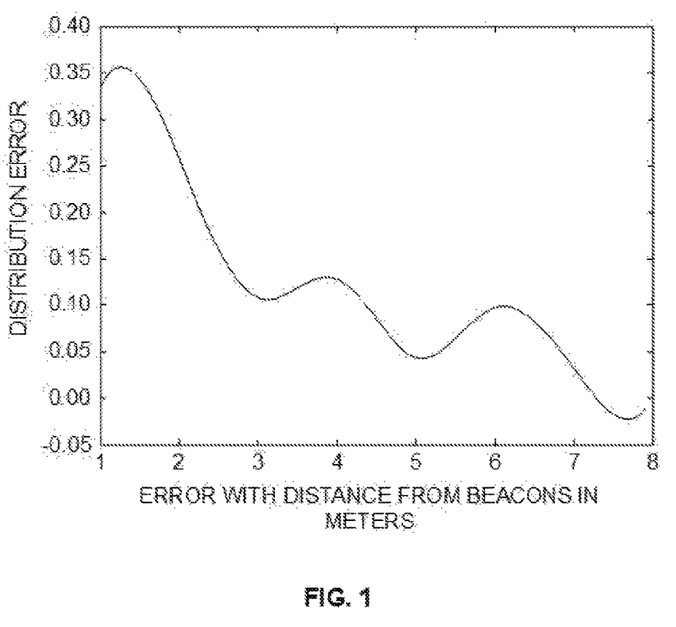
FIG. 1 is a graphical representation illustrating probability distribution of error with distance from beacons.

As mentioned above, indoor localization using both radio frequency (RE) and inertial sensors on a mobile device is a common approach. Localization and mapping are performed to compute the most probable location using sensors and control values (if any). Current solutions have considered both the techniques and methods of fusing them. One of the existing solution is inertial navigation using Pedestrian Dead Reckoning (PDR) and particle filter (PF), which is a standard approach. However, it is well-known and evident that PDR is susceptible to stride-length inaccuracies and magnetic noise. Another approach is using Received Signal Strength Indication (RSSI) from Radio Frequency (RF) sources on a mobile phone. Since signal strength decays with distance, it is possible to elucidate distance from the same. However, such measurements are corrupted by multipath and fading. Further, combining Bluetooth and inertial based localization rely on relative error models, proximity profiles and mostly fingerprinting based approaches because distance measurements from Bluetooth Low Energy (BLE) provide Received Signal Strength Indication (RSSI) readings which are not stable. Hence, none of the methods are individually correct but can provide location information with some granularity and error distribution. FIG. 1 is a graphical representation illustrating probability distribution of error with distance from beacons. The BLE location error is spatial in nature, and hence the error is high when an object (e.g., the user) is less than 2 meters from beacon as can be seen in FIG. 1. The y-axis in the graphical representation of FIG. 1 represents one or more units (e.g., 1 to 8), wherein each unit is 10 centimeters approximately, in one example embodiment.

The embodiments of the present disclosure proposes systems and methods that use the fact that BLE based localization systems can only give stable distance estimates for a range of certain meters. Utilizing this information, the embodiments of the present disclosure implements a fusing system wherein the entire indoor area (e.g., a floor plan) is divided into one or more grids (e.g., square grids of roughly 8 meters diagonal, or 4*sqrt(2) side-length). One or more beacons are placed at each crossing point of such grid. The terms "one or more grids" and "a plurality of grids" may be interchangeably used herein. Using inertial methods, a rough location of a user is derived to find out which grid the user belongs to. Following that a grid-based trilateration is carried out. Finally, the systems of the present disclosure implements spatial error model to fuse inertial and BLE based positions to arrive at a final more accurate location, FIG. 2, with reference to FIG. 1, is a block diagram of a sensor data fusing system 200 according to an embodiment of the present disclosure. The sensor data fusing system 200 comprises a memory 202, a hardware processor 104, and an input/output (I/O) interface 206. The memory 202 further includes one or more modules 208 (or modules 208). The memory 202, the hardware processor 204, the input/output (I/O) interface 206, and/or the modules 208 may be coupled by a system bus or a similar mechanism.

Figure 2:
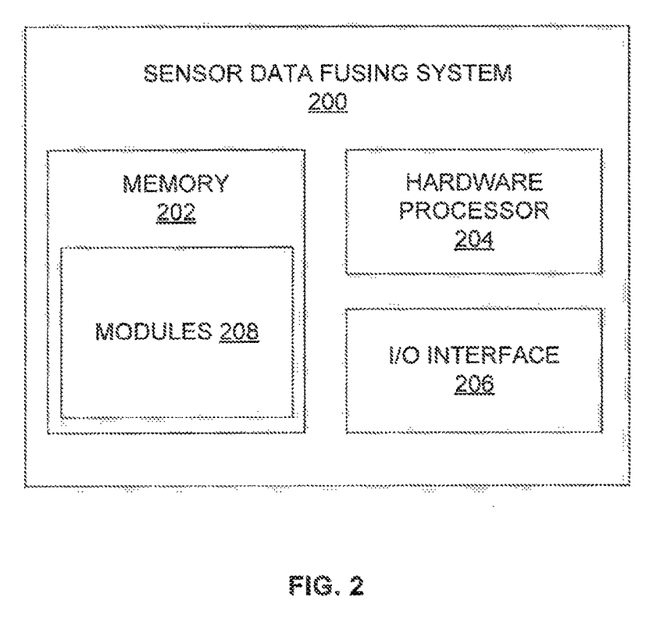
FIG. 2 is a block diagram of a sensor data fusing system according to an embodiment of the present disclosure.

The memory 202, may store instructions, any number of pieces of information, and data, used by a computer system, for example the sensor data fusing system 200 to implement the functions (or embodiments) of the present disclosure. The memory 202 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 202 may be configured to store information, data, applications, instructions or the like for enabling the sensor data fusing system 200 to carry out various functions in accordance with various example embodiments.

Additionally or alternatively, the memory 202 may be configured to store instructions which when executed by the hardware processor 204 causes the sensor data fusing system 200 to behave in a manner as described in various embodiments (e.g., computing weights, determining the distance between user and beacons for localization). The memory 202 stores information for example, information comprising sensory information, for example, sensor data obtained from one or more inertial sensors, one or more Bluetooth low energy (BLE) sensors, and combinations thereof.

The hardware processor 204 may be implemented as one or more microprocessors, microcomputers, microcontrollers, digital signal processors, central processing units, state machines, logic circuitries, and/or any devices that manipulate signals based on operational instructions. Further, the hardware processor 204 may comprise a multi-core architecture. Among other capabilities, the hardware processor 204 is configured to fetch and execute computer-readable instructions or modules stored in the memory 202. The hardware processor 204 may include circuitry implementing, among others, audio and logic functions associated with the communication. For example, the hardware processor 204 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The hardware processor 204 thus may also include the functionality to encode messages and/or data or information. The hardware processor 204 may include, among other things, a clock, an arithmetic logic unit (ALU) and logic gates configured to support operation of the hardware processor 204. Further, the hardware processor 204 may include functionality to execute one or more software programs, which may be stored in the memory 202 or otherwise accessible to the hardware processor 204.

The hardware processor 204 is configured by the instructions stored in the memory 202. The hardware processor 204 when configured by the instructions to read and parse a floor plan to obtain a location of a user. The floor plan comprises one or more grids. Each grid comprises one or more beacons positioned at every corner of the grid. As discussed in FIG. 1, since the BLE location error is spatial in nature, and the error is high when an object (e.g., the user) is less than 2 meters from the beacon. Therefore, the floor plan (or the region of interest) is divided into grids for localization. For example, when the floor plan is divided into the one or more grids, each grid may be a square of 8 meters diagonal and the one or more beacons may be positioned at the corners of the square.

Figure 3:
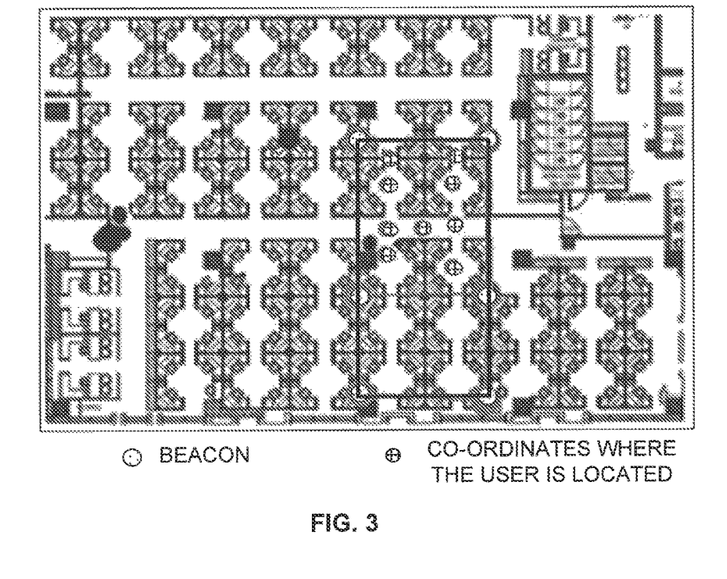
FIG. 3 is a grid layout of the floor plan having one or more grids according to an embodiment of the present disclosure.

FIG. 3, with reference to FIGS. 1 through 2, is a grid layout of the floor plan having one or more grids according to an embodiment of the present disclosure. A grid from the one or more grids is identified based on the location of the user obtained from the floor plan. The location of the user is indicative of initial co-ordinates (e.g., a first initial co-ordinate 'x' and a second initial co-ordinate 'y'). The sensor data fusing system 200 executes one or more binary search techniques (stored in the memory 202) to identify a grid amongst the one or more grids. In one embodiment, the sensor data fusing system 200 execute a spatial binary search technique to provide the grid identifiers based on the x, y location of the user in O(2 log(n)). A row vector in the grid is identified based on the first initial co-ordinate 'x' of the location using the binary search technique. Similarly, a column vector corresponding to the row vector in the grid is identified based on the second initial co-ordinate 'y' of the location using a linear binary search technique. Based on the intersection of the row vector and column vector, the grid is identified. Further each beacon identifier specific to each beacon from the one or more beacons positioned at every corner of the identified grid is identified based on the intersection of the row vector and the column vector. Once the one or more beacons are identified based on the intersections, a set of beacon identifiers pertaining to the identified beacons are obtained. More specifically, the sensor data fusing system 200 identifies the beacon identifiers using the below technique:

---

Begin:
Given a point (x, y)
Use x to find the 'row' vector in grid space using binary search technique.
For that 'row' use linear binary search to find the 'column' vector using y.
Return the Universally unique identifier (UUID) of the beacons at intersection of row and column
End.

---

The hardware processor 204 further determines a distance between the user and the one or more identified beacons in the identified grid. Alternatively, this distance may be manually computed by one or more users (e.g., the user), and provided to the hardware processor 204 as an input. The hardware processor 204 is further configured by the instructions to trilaterate (or triangulate) the location of the using the one or more beacon identifiers, wherein each beacon identifier is specific to a beacon from the one or more beacons positioned at each corner of the grid. The hardware processor 204 further assigns a weight to the trilaterated location based on the distance between the user and the one or more beacons in the identified grid to obtain a first set of weights. In other words, the weight may be assigned to the trilaterated location based on the distance between the user and each of the beacons positioned at corners in the grid.

Alternatively, the weight may be manually assigned by the user to the trilaterated location by computing the distance between the user and each beacon. For example, a first weight may be computed (or assigned) based on the distance between the user (a first co-ordinate) and a first beacon positioned at a first corner of the grid. Similarly, a second weight may be computed (or assigned) based on the distance between the user (a second co-ordinate) and a second beacon positioned at a second corner of the grid. Similarly, a third weight may be computed (or assigned) based on the distance between the user (a third co-ordinate) and a third beacon positioned at a third corner of the grid. Likewise, a fourth weight may be computed (or assigned) based on the distance between the user (a fourth co-ordinate) and a fourth beacon positioned at a fourth corner of the grid. A higher weight is assigned when the distance (IF inertial location) is greater than a predefined distance (e.g., 2 meters) from each beacon placed at each corner of the grid. Similarly, a lower weight is assigned when the distance (IF inertial location) is less than the predefined distance from each beacon placed at each corner of the grid. For example, the first weight may be computed (or assigned) may be higher weight when the distance between the user (the first co-ordinate) and the first beacon positioned at the first corner of the grid is greater than a predefined distance. Similarly, the first weight may be computed (or assigned) may be lower weight when the distance between the user (the first co-ordinate) and the first beacon positioned at the first corner of the grid is less than a predefined distance. The co-ordinates are represented by way of chequered circles in FIG. 3, and the beacons are represented by way of dotted circles in FIG. 3. The dotted circles representing the beacons are indicative of the identified grid. In other words, the fusion process to be implemented by the sensor data fusing system 200 uses spatial information to assign dynamic weights to BLE (also referred as RF) based location based on how far the user is from any of the beacons. Below is an illustrative criteria to assign the weight:

```
Begin:
IF inertial_location > 2.0 meter from all beacons
then
   weight_ble ← high_weight_ble
else
   weight_ble ← low_weight_ble
endif
:End
```

The first weight, the second weight, the third weight and the fourth weight together form the first set of weights.

The hardware processor 204 is further configured by the instructions to compute one or more weights using number of particles generated with respect to an inertial measurement obtained from an inertial sensor to obtain a second set of weights. Alternatively, the one or more weights may be computed by a user using information, for example, information includes number of particles generated with respect to the inertial measurement (e.g., inertial location) obtained from an inertial sensor. The inertial sensor(s) may be positioned (or located) in close proximity of the location of the user and the identified grid. For example, the inertial measurement (e.g., inertial location) may be obtained from one or more accelerometers executed in computing device (e.g., a mobile communication device) associated with the user (or other users who are in close proximity) of the location. The first set of weights and the second set of weights are indicative of x and y co-ordinates respectively. Once the first set of weights and the second set of weights are obtained, these weights are then fused to obtain an exact location of an object (e.g., the user) in the location/grid. More specifically, the hardware processor 204 is further configured by the instructions to fuse the first set of weights and the second set of weights to obtain a first coordinate (e.g., a first actual co-ordinate) and a second co-ordinate (e.g., a second actual co-ordinate) of a specific position of the user in the location. The first initial co-ordinate 'x' and the second initial co-ordinate 'y' are different from the first actual co-ordinate and the second actual co-ordinate which provide an exact position of the user in the location. Alternatively, one or more co-ordinates (e.g., x and y inertial co-ordinates, and x and y RF (BLE) co-ordinates) pertaining to weights assigned/computed (e.g., the first set of weight and the second set of weights) are fused together to obtain the first actual co-ordinate and the second actual co-ordinate which provide the exact position of the user in the identified grid of the location. Moreover, the first actual co-ordinate and the second actual co-ordinate which provide the exact position of the user in the location in the identified grid are obtained based on the prioritization of weights. For example, x and y co-ordinates with higher weights may be prioritized over lower weights for fusion.

Alternatively, the sensor data fusing system 200 may execute the modules 208 comprising a floor plan parsing module that when executed by the hardware processor 204 reads (and/or analyses) and parses the floor plan to obtain the location of the user. The modules further includes a grid identification module that identifies a grid from the one or more grids based on the location of the user to obtain an identified grid as shown in FIG. 3. Similarly, the modules 208 further comprises a weight calculator that assigns/computes the weights (e.g., the first set of weights) to the trilaterated location based on the distance between the user and from all beacons (e.g., each of the beacons positioned at corners) in the grid. Similarly, the weight calculator computes the second set of weights using number of particles generated with respect to the inertial measurement obtained from the inertial sensor. The modules 208 further comprises a fusing module that fuses the first set of weights and the second set of weights to obtain (or derive/determine) the first actual coordinate and the second actual co-ordinate that are indicative of a specific position of the user in the location. The modules for example, the floor plan parsing module, a grid locator (or a grid identification module), the weight calculator, and the fusing module are implemented as at least one of a logically self-contained part of a software program, a self-contained hardware component, and/or, a self-contained hardware component, with a logically self-contained part of a software program embedded into each of the hardware component that when executed perform the above method described herein, in one embodiment.

Since, inertial sensor data is based on tracking, and BLE sensor data is based on positioning, fusing is performed based on one or more criteria. The one or more criteria include: fusing to be performed (i) each time user comes to rest position, and (ii) when a noisy inertial window is determined (or obtained) due to ambient noise such as "above a threshold magnetic field", or "usage of communication device (noisy window caused due to improper/incorrect orientation of the communication device)" (e.g., a mobile communication device). The mobile communication device is used within the indoor facility where the one or more inertial sensors and the one or more BLE sensors are positioned to obtain inertial sensor data and BLE sensor data. If neither of the criteria occur, then the sensor data fusing system 200 fuses for every pre-determined time period (e.g., for every 30 seconds), based on a timer expiry.

Figure 4:
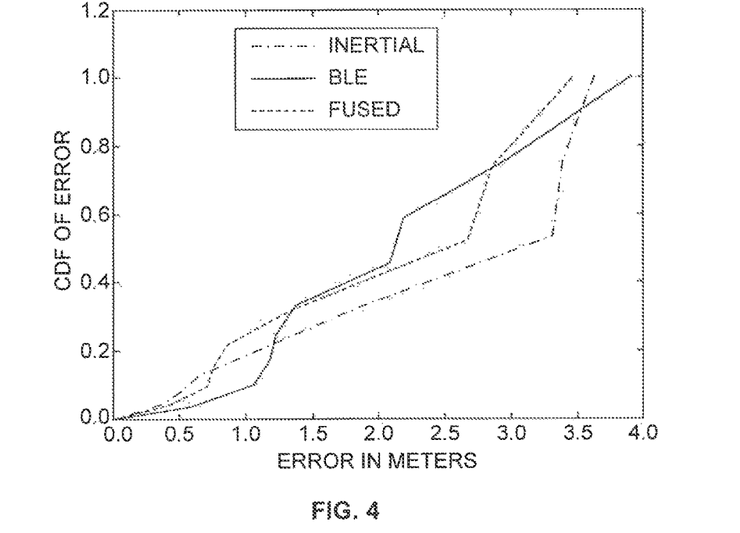
FIG. 4 is a graphical representation illustrating Cumulative Distribution Function (CDF) of error from inertial, BLE and the fused localization according to an embodiment of the present disclosure.

FIG. 4, with reference to FIGS. 1 through 3, is a graphical representation illustrating Cumulative Distribution Function (CDF) of error from inertial, BLE and the fused localization according to an embodiment of the present disclosure.

Figure 5:
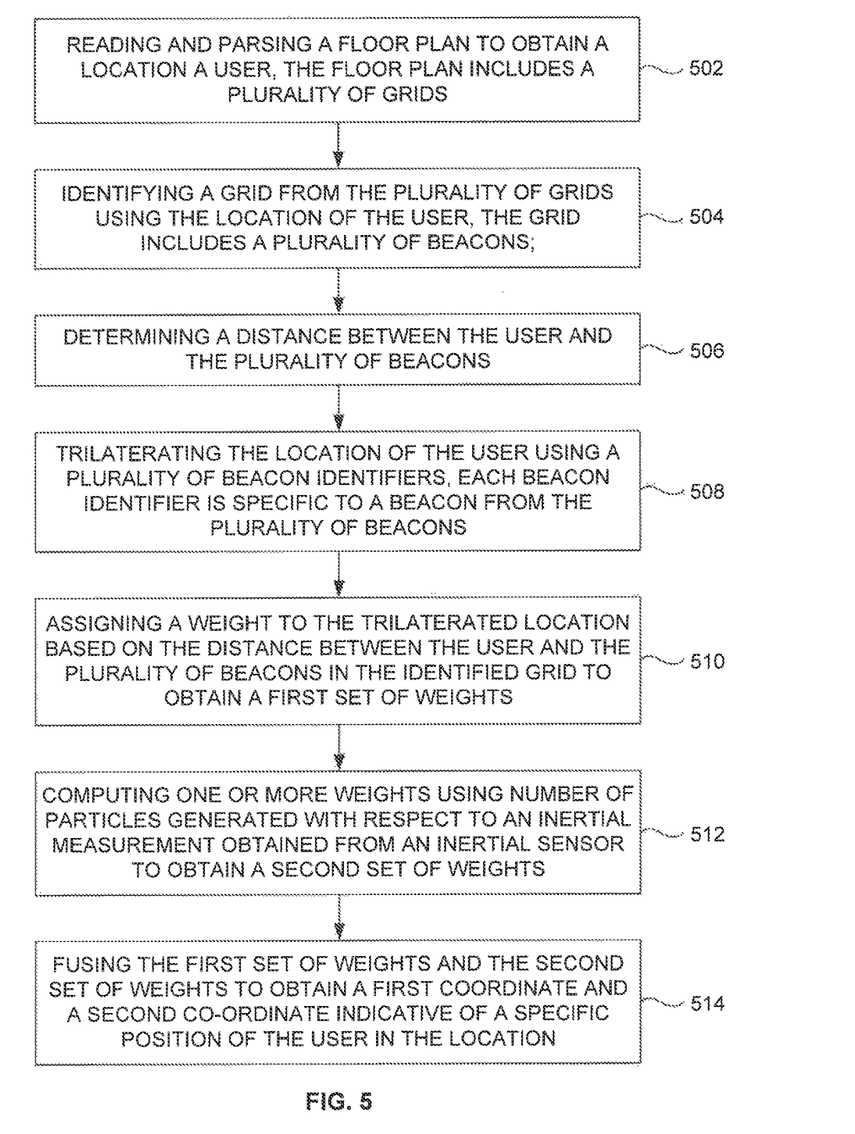
FIG. 5 is a flow diagram illustrating a sensor data fusing method executed using the sensor data fusing system of FIG. 2 according to an embodiment of the present disclosure.

FIG. 5, with reference to FIGS. 1 through 4, is a flow diagram illustrating a sensor data fusing method executed using the sensor data fusing system 200 of FIG. 2 according to an embodiment of the present disclosure. The sensor data fusing method includes reading and parsing (502), a floor plan to obtain a location of a user, wherein the floor plan includes a plurality of grids; identifying (504), a grid from the plurality of grids using the location of the user, wherein the grid includes a plurality of beacons; determining (506), a distance between the user and the plurality of beacons; trilaterating (508), the location of the user using a plurality of beacon identifiers, each beacon identifier specific to a beacon from the plurality of beacons; assigning (510), a weight to the trilaterated location based on the distance between the user and the plurality of beacons in the grid to obtain a first set of weights; computing (512), one or more weights using number of particles generated with respect to an inertial measurement obtained from an inertial sensor to obtain a second set of weights; and fusing (514), the first set of weights and the second set of weights to obtain a first coordinate and a second co-ordinate of a specific position of the user in the location. Assigning a weight to the trilaterated location includes assigning a higher weight when the distance is greater than a predefined distance from each beacon placed at each corner of the grid. Assigning a weight to the trilaterated location includes assigning a lower weight when the distance is less than a predefined distance from each beacon placed at each corner of the grid. The step of identifying the grid includes identifying a row vector in the one or more grids based on a first initial co-ordinate of the location using a binary search technique. The step of identifying the grid further includes identifying a column vector corresponding to the row vector in the plurality of grids based on a second initial co-ordinate of the location using a linear binary search technique. The step of identifying the grid further includes identifying the grid and each beacon identifier specific to each beacon from the plurality of beacons based on an intersection of the row vector and the column vector to obtain the set of beacon identifiers.

Figure 6A:
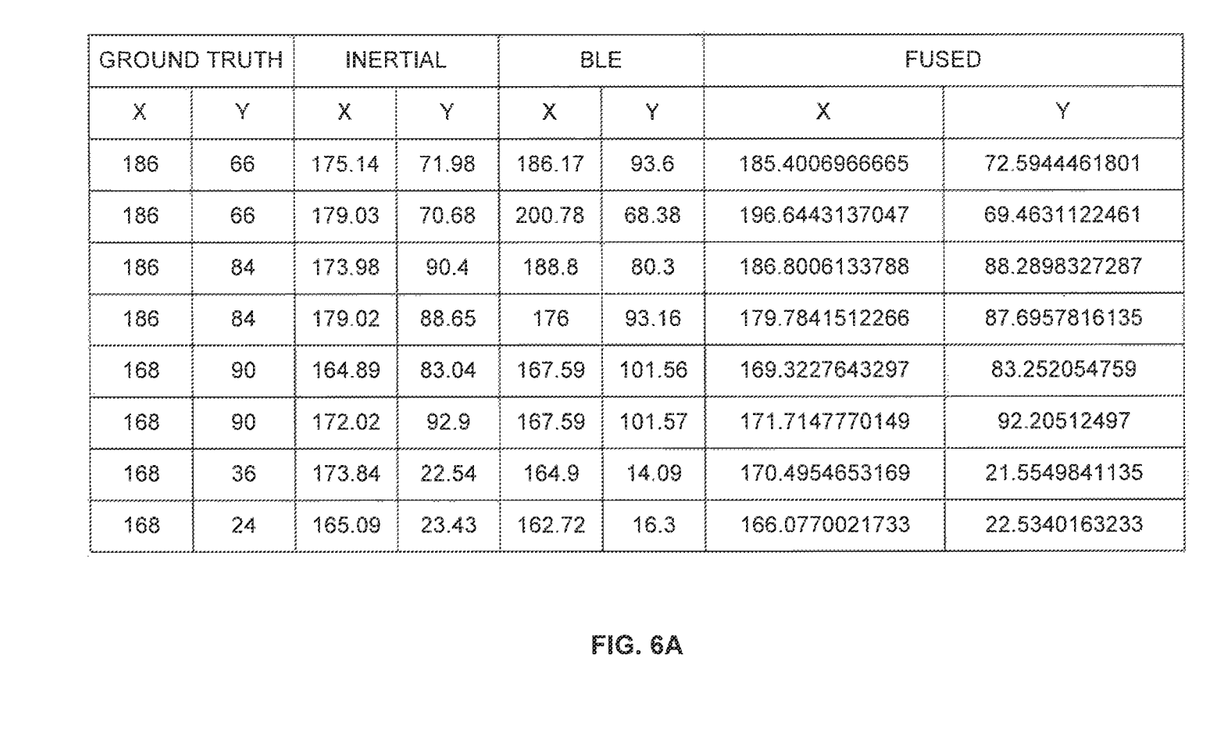
FIG. 6A illustrates experimental results comprising weights for inertial sensor data and BLE sensor data, fusing the weights based on measurement errors for localization using the sensor data fusing system of FIG. 2 according to one or more embodiments of the present disclosure.

FIG. 6A, with reference to FIGS. 1 through 5, illustrates experimental results comprising weights for inertial sensor data and BLE (RF) sensor data, fusing the weights based on measurement errors for localization using the sensor data fusing system 200 of FIG. 2 according to one or more embodiments of the present disclosure. The ground truth X and Y co-ordinates are the first and second initial co-ordinates (also referred as true X and Y co-ordinates). The inertial X and Y co-ordinates are the sensor data (or inertial measurements) obtained from an accelerometer (using a mobile communication device associated with the user). In other words, the inertial X and Y co-ordinates are the X and Y co-ordinates from the accelerometer data. Similarly, the BLE (RF) X and Y co-ordinates are the X and Y co-ordinates indicating the distance between the user and each of the beacon positioned at every corner of the identified grid. The BLE (RF) X and Y co-ordinates are the co-ordinates obtained based on the distance between the user and the beacons placed at every corner of the identified grid. The fused X and Y co-ordinates are the actual X and Y co-ordinates obtained from the weights (e.g., the first set of weights and the second set of weights) assigned (or computed) to the inertial X and Y co-ordinates and the BLE (RF) X and Y co-ordinates. The fused X and Y co-ordinates are the actual X and Y co-ordinates that specify an exact position of the user in the location (or the identified grid).

Figure 6B:
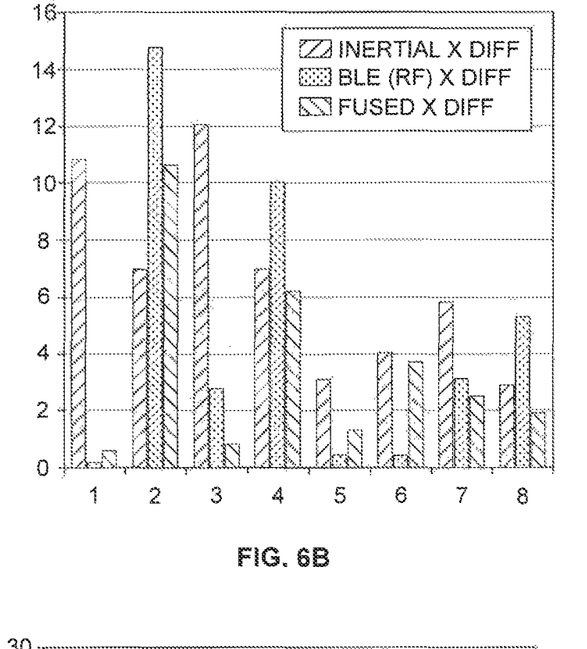
FIG. 6B is a graphical representation illustrating inertial X co-ordinate, BLE (RE) X co-ordinate, and the fused X co-ordinate according to an embodiment of the present disclosure.
Figure 6C:
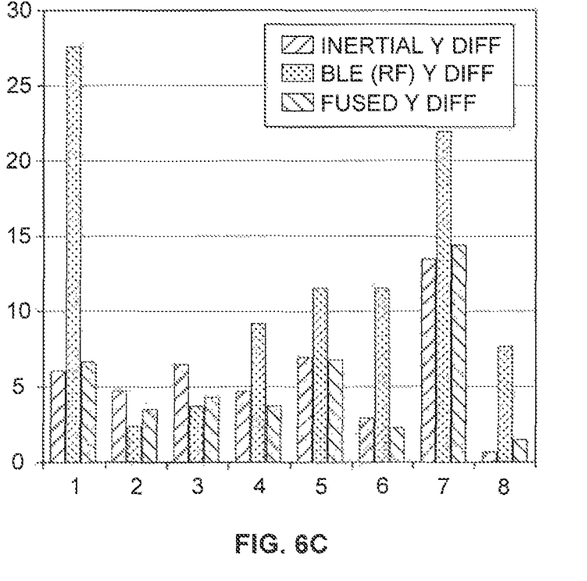
FIG. 6C is a graphical representation illustrating inertial Y co-ordinate, BLE (RF) Y co-ordinate, and the fused Y co-ordinate according to an embodiment of the present disclosure.

FIG. 6B, with reference to FIGS. 1 through 6A, is a graphical representation illustrating inertial X co-ordinate, BLE (RF) X co-ordinate, and the fused X co-ordinate according to an embodiment of the present disclosure. FIG. 6C, with reference to FIGS. 1 through 6B, is a graphical representation illustrating inertial Y co-ordinate, BLE (RE) Y co-ordinate, and the fused Y co-ordinate according to an embodiment of the present disclosure. The y-axis in the graphical representations of FIGS. 6B and 6C represent one or more units (e.g., 1 to 8), wherein each unit is 10 centimeters approximately, in one example embodiment.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of the present disclosure provide sensor data fusing systems and methods that account the spatial error or spatial limitation of BLE based localization. Unlike conventional systems and methods which fail to consider spatial error or spatial limitation of BLE based localization, the sensor data fusing system 200 determines distance between the user and the beacons placed at corners of the identified grid, and account distance limitation factor of BLE based localization, and the spatial nature of localization error from BLE for fusing weights specific to inertial measurements and BLE sensors to obtain precise (or accurate) co-ordinates that are indicative of the position of the user in the location, and thereby localizing the user accurately beyond 2 meters (e.g., 8 meters) using BLE sensor data.

The embodiments of the present disclosure further enable the sensor data fusing system 100 to dynamically control the fusion weights using the distance from the beacons, and accordingly update in real-time the fusion weights without any user intervention. The embodiments of the present disclosure further enable trilateration being done at server level to obtain the spatial error from BLE beacons and further enables to map it properly as the map for the area is stored at server level. The embodiments of the present disclosure may be implemented in real time indoor tracking system, which can be an organization for finding common utilities like parking, conference rooms, and the like. The embodiments of the present disclosure further enable the sensor data fusing system 100 to be implemented in real time indoor path assistance solution such as in warehouses to guide Goods downloaded from the transportation vehicles to be moved to one or more shelves. The sensor data fusing system 100 may also be further used for providing real time location information of people in an emergency evacuation scenario, which can be helpful to evacuation marshals. The sensor data fusing system 100 may be implemented in Indoor Navigation systems for events and guiding users to venue of the sessions within the events.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system comprising:
a memory storing instructions;
a processor communicatively coupled to said memory, wherein said processor is configured by said instructions to:
read and parse a floor plan to obtain a location of a user, wherein said floor plan comprises a plurality of grids;

identify a grid from said plurality of grids using said location of said user, wherein said grid comprises a plurality of beacons placed at each crossing point of the grid;

determine a distance between said user and said plurality of beacons in said identified grid;

trilaterate said location of said user using a plurality of beacon identifiers, each beacon identifier of said plurality of beacon identifiers is specific to a beacon from said plurality of beacons;

assign a weight to the trilaterated location based on said distance between said user and said plurality of beacons in said grid to obtain a first set of weights;

compute one or more weights using number of particles generated with respect to an inertial measurement obtained from an inertial sensor to obtain a second set of weights, wherein the inertial sensor is attached of the location of the user and the identified grid; and fuse, based on one or more criteria, said first set of weights and said second set of weights to obtain a first actual coordinate and a second actual co-ordinate, wherein the first actual coordinate and the second actual coordinate are indicative of a specific position of said user in said location; wherein, the one or more criteria includes fusing to be performed:

each time the user comes to a rest position and when a noisy inertial window is determined due to ambient noise or improper orientation of the inertial sensors; or for every pre-determined time period, based on a timer expiry.

2. The system of claim 1, wherein said weight, assigned to the trilaterated location, is a higher weight when said distance between said user and each of said plurality of beacons in said grid is greater than a predefined distance from each beacon placed at each corner of said grid.

3. The system of claim 1, wherein said weight, assigned to the trilaterated location, is a lower weight when said distance between said user and each of said plurality of beacons in said grid is less than a predefined distance from each beacon placed at each corner of said grid.

4. The system of claim 1, wherein a row vector in said plurality of grids is identified based on a first initial co-ordinate of said location using a binary search technique.

5. The system of claim 4, wherein a column vector corresponding to said row vector in said plurality of grids is identified based on a second initial co-ordinate of said location using a linear binary search technique.

6. The system of claim 5, wherein said grid and each beacon identifier specific to each beacon from said plurality of beacons are identified based on an intersection of said row vector and said column vector to obtain said set of beacon identifiers.

7. A hardware processor implemented method comprising:

reading and parsing a floor plan to obtain a location of a user, wherein said floor plan comprises a plurality of grids;

identifying a grid from said plurality of grids using said location of said user, wherein said grid comprises a plurality of beacons placed at each crossing point of the grid;

determining a distance between said user and said plurality of beacons in said identified grid;

trilaterating said location of said user using a plurality of beacon identifiers, each beacon identifier of said plurality of beacon identifiers is specific to a beacon from said plurality of beacons;

assigning a weight to the trilaterated location based on said distance between said user and said plurality of beacons in said grid to obtain a first set of weights;

computing one or more weights using number of particles generated with respect to an inertial measurement obtained from an inertial sensor to obtain a second set of weights, wherein the inertial sensor is attached of the location of the user and the identified grid; and fusing, based on one or more criteria, said first set of weights and said second set of weights to obtain a first actual coordinate and a second actual co-ordinate, wherein the first actual coordinate and the second actual coordinate are indicative of a specific position of said user in said location; wherein, the one or more criteria includes, fusing to be performed:

each time the user comes to a rest position; and when a noisy inertial window is determined due to ambient noise or improper orientation of the inertial sensors; or for every pre-determined time period, based on a timer expiry.

8. The method of claim 7, wherein assigning a weight to the trilaterated location comprises assigning a higher weight when said distance between said user and each of said plurality of beacons in said grid is greater than a predefined distance from each beacon placed at each corner of said grid.

9. The method of claim 7, wherein assigning a weight to the trilaterated location comprises assigning a lower eight when said distance between said user and each of said plurality of beacons in said grid is less than a predefined distance from each beacon placed at each corner of said grid.

10. The method of claim 7, wherein identifying said grid comprises identifying a row vector in said one or more grids based on a first initial co-ordinate of said location using a binary search technique.

11. The method of claim 10, wherein identifying said grid comprises identifying a column vector corresponding to said row vector in said plurality of grids based on a second initial co-ordinate of said location using a linear binary search technique.

12. The method of claim 11, wherein identifying said grid comprises identifying said grid and each beacon identifier specific to each beacon from said plurality of beacons based on an intersection of said row vector and said column vector to obtain said set of beacon identifiers.

13. One or more non-transitory machine readable information storage mediums comprising one or more instructions which when executed by one or more hardware processors causes:

reading and parsing a floor plan to obtain a location of a user, wherein said floor plan comprises a plurality of grids;

identifying a grid from said plurality of grids using said location of said user, wherein said grid comprises a plurality of beacons placed at each crossing point of the grid;

determining a distance between said user and said plurality of beacons in said identified grid;

trilaterating said location of said user using a plurality of beacon identifiers, each beacon identifier of said plurality of beacon identifiers is specific to a beacon from said plurality of beacons;

assigning a weight to the trilaterated location based on said distance between said user and said plurality of beacons in said grid to obtain a first set of weights;

computing one or more weights using number of particles generated with respect to an inertial measurement obtained from an inertial sensor to obtain a second set of weights, wherein the inertial sensor is attached of the location of the user and the identified grid; and fusing, based on one or more criteria, said first set of weights and said second set of weights to obtain a first actual coordinate and a second actual co-ordinate, wherein the first actual coordinate and the second actual coordinate are indicative of a specific position of said user in said location; wherein, the one or more criteria includes, fusing to be performed:

each time the user comes to a rest position; and when a noisy inertial window is determined due to ambient noise or improper orientation of the inertial sensors; or for every pre-determined time period, based on a timer expiry.

14. The one or more non-transitory machine readable information storage mediums of claim 13, wherein assigning a weight to the trilaterated location comprises assigning a higher weight when said distance between said user and each of said plurality of beacons in said grid is greater than a predefined distance from each beacon placed at each corner of said grid.

15. The one or more non-transitory machine readable information storage mediums of claim 13, wherein assigning a weight to the trilaterated location comprises assigning a lower weight when said distance between said user and each of said plurality of beacons in said grid is less than a predefined distance from each beacon placed at each corner of said grid.

16. The one or more non-transitory machine readable information storage mediums of claim 13, wherein identifying said grid comprises identifying a row vector in said one or more grids based on a first initial co-ordinate of said location using a binary search technique.

17. The one or more non-transitory machine readable information storage mediums of claim 16, wherein identifying said grid comprises identifying a column vector corresponding to said row vector in said plurality of grids based on a second initial co-ordinate of said location using a linear binary search technique.

18. The one or more non-transitory machine readable information storage mediums of claim 17, wherein identifying said grid comprises identifying said grid and each beacon identifier specific to each beacon from said plurality of beacons based on an intersection of said row vector and said column vector to obtain said set of beacon identifiers.

* * * * *